(12) United States Patent
Nunomaki (10) Patent No.: US 9,703,403 B2
(45) Date of Patent: Jul. 11, 2017

(54) IMAGE DISPLAY CONTROL APPARATUS AND IMAGE DISPLAY CONTROL METHOD

(75) Inventor: Takashi Nunomaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 242 days.

(21) Appl. No.: 13/292,769

(22) Filed: Nov. 9, 2011

(65) Prior Publication Data

US 2012/0154307 A1  Jun. 21, 2012

(30) Foreign Application Priority Data

Dec. 21, 2010 (JP) ................. P2010-284322

(51) Int. Cl.
*G06F 3/041* (2006.01)
*G06F 1/32* (2006.01)
*G06F 3/0488* (2013.01)

(52) U.S. Cl.
CPC ............ *G06F 3/041* (2013.01); *G06F 1/3203* (2013.01); *G06F 1/3231* (2013.01); *G06F 1/3262* (2013.01); *G06F 3/04883* (2013.01); *Y02B 60/1289* (2013.01)

(58) Field of Classification Search
CPC ....................................................... G06F 3/041
USPC ......................................................... 345/173
See application file for complete search history.

(56) References Cited

U.S. PATENT DOCUMENTS

| | | | | |
|---|---|---|---|---|
| 2006/0256082 A1* | 11/2006 | Cho | ...................... | G06F 1/1626 345/156 |
| 2007/0262970 A1* | 11/2007 | Matsumoto | ........... | G06F 3/0425 345/173 |
| 2008/0079696 A1* | 4/2008 | Shim | ..................... | G06F 1/1626 345/170 |
| 2008/0090617 A1 | 4/2008 | Sutardja | | |
| 2008/0158172 A1* | 7/2008 | Hotelling | .............. | G06F 1/3231 345/173 |
| 2009/0139778 A1 | 6/2009 | Butler et al. | | |
| 2009/0140863 A1 | 6/2009 | Liu et al. | | |

(Continued)

FOREIGN PATENT DOCUMENTS

CN    101025519 A    8/2007
EP    1 942 396 A1    7/2008

(Continued)

OTHER PUBLICATIONS

U.S. Appl. No. 13/314,486, filed Dec. 8, 2011, Takaoka, et al.

(Continued)

*Primary Examiner* — Jennifer Mehmood
*Assistant Examiner* — Carl Adams
(74) *Attorney, Agent, or Firm* — Oblon, McClelland, Maier & Neustadt, L.L.P.

(57) ABSTRACT

An image display control apparatus and method are used to detect an object that is in proximity to a display. A display controller is used to change the display from a first display state to a second display state after the object is not detected for a predetermined time period. The display state is then restored to the first display state when the detector detects the object being in proximity to the display. In another aspect, the display controller changes the display to the first display state from the second display state when the detector detects the object being in proximity to the display, where the second display state is a lower power state than the first display state.

23 Claims, 8 Drawing Sheets (56) References Cited

U.S. PATENT DOCUMENTS

| | | | |
|---|---|---|---|
| 2009/0160541 A1 | 6/2009 | Liu et al. | |
| 2009/0256814 A1* | 10/2009 | Chung | G06F 1/3215 345/173 |
| 2010/0117949 A1 | 5/2010 | Lai et al. | |
| 2011/0109572 A1* | 5/2011 | Deslippe | G06F 3/03547 345/173 |
| 2011/0134300 A1* | 6/2011 | Chung | H04M 1/0254 348/333.01 |
| 2012/0212440 A1* | 8/2012 | Nishida | G06F 3/0488 345/173 |

FOREIGN PATENT DOCUMENTS

| | | |
|---|---|---|
| JP | 06-119090 A | 4/1994 |
| JP | 06-230860 A | 8/1994 |
| JP | 2002-082734 | 3/2002 |
| JP | 2004-304260 A | 10/2004 |
| JP | 2010-067104 A | 3/2010 |
| JP | 2010-244132 A | 10/2010 |
| TW | 200927033 | 7/2009 |
| WO | WO 2008/136551 A1 | 11/2008 |
| WO | WO 2009/067224 A1 | 5/2009 |

OTHER PUBLICATIONS

U.S. Appl. No. 13/285,031, filed Oct. 31, 2011, Nunomaki.
U.S. Appl. No. 13/281,490, filed Oct. 26, 2011, Amano, et al.
U.S. Appl. No. 13/324,463. filed Dec. 13, 2011, Takaoka, et al.
Extended European Search Report issued Jul. 10, 2013 in Patent Application No. 11190876.0.
Office Action issued Jun. 3, 2014 in Japanese Patent Application No. 2010-284322.
Japanese Office Action issued Aug. 19, 2014, in Japan Patent Application No. 2010-284322.
Chinese Office Action issued Jan. 23, 2015 in corresponding Chinese Patent Application No. 201110415883.9 (with English Translation) (21 pages).
Combined Chinese Office Action and Search Report issued Feb. 15, 2016 in Patent Application No. 201110415883.9 (with English language translation).
Office Communication issued Oct. 18, 2016, in European Patent Application No. EP 11 190 876.0.

\* cited by examiner

IMAGE DISPLAY CONTROL APPARATUS AND IMAGE DISPLAY CONTROL METHOD

BACKGROUND

The present disclosure relates to image display control apparatuses and image display control methods, and particularly relates to an image display control apparatus and an image display control method capable of restoring display by an easier operation for a user.

Some electronic apparatuses including display panels have a function of turning light off or entering a low-luminance state for power saving or protection of pixels in the display panels when it is determined that a user has not used the electronic apparatuses for a predetermined period of time. In this case, display is restored by a key operation or tapping on a display panel performed by the user as a trigger, for example. Furthermore, a screen-saver may be cancelled when the user inputs a graphic (gesture) registered in advance, for example (refer to Japanese Unexamined Patent Application Publication No. 2002-82734, for example).

SUMMARY

However, in a method for restoring display by a tapping on a display panel performed by a user as a trigger, an operation of tapping the display panel once should be performed for restoration. In addition, when an operation of selecting a predetermined operation button displayed in the display panel is to be performed after the restoration of the display, for example, two operations (tapping), i.e., tapping for the restoration of the display and tapping for the selection of the operation button, should be performed, which is troublesome. Furthermore, a user who does not realize that a tapping operation is a method for restoring display is not able to restore the display.

It is desirable to restore display by an easier operation for the user.

According to a first embodiment, an image display control apparatus includes:

a detector that detects an object being in proximity of a display; and a display controller that changes the display from a first display state to a second display state after the object is not detected for a predetermined time period, and restores the display to the first display state when the detector detects the object being in proximity to the display.

According to one aspect, the apparatus further includes:

the display, the display being a touchpanel display that includes the detector.

According to another aspect, the first display state is a steady state, and the second display state is a low-luminance state.

According to another aspect the first display state is a low-luminance state, and the second display state is a black-out state.

According to another aspect, the first display state is a steady state, and the second display state is a button-off state.

According to another aspect, when the display controller operates the display in the button-off state, and the detector detects the object being in proximity to the display, the display controller changes the display to the steady state.

According to another aspect, the detector detects one of a user finger, a user palm and a dielectric object as the object.

According to another aspect, the apparatus further includes a processing circuit that detects a movement gesture of the object while the object remains in proximity to the display and compares the movement gesture with a registered gesture, wherein the display controller restores the display to a steady state when the movement gesture matches the registered gesture.

According to another aspect, the registered gesture is one of a user registered gesture and a pre-installed gesture.

According to another aspect, the display controller causes an indicator to be displayed on the display when the detector detects the object to be in proximity to the display.

According to another embodiment, an image display control apparatus includes:

a detector that detects an object being in proximity of a display; and a display controller that changes the display to a first display state from a second display state when the detector detects the object being in proximity to the display, the second display state being a lower power state than the first display state.

According to one aspect, the apparatus further includes the display, the display being a touchpanel display that includes the detector.

According to another aspect, the first display state is a steady state, and the second display state is one of a low-luminance state and a black-out state, the detector detects a touch of the object to the display as a touch event, and the display controller also restores the display to the steady state when the display is in one of the low-luminance state and the black-out state and the detector detects the touch event.

According to another aspect, the detector detects the touch event, and a processing circuit that performs a tapping operation in response to the touch event detected by the detector.

According to another aspect, the detector is configured to detect a proximity of one of a user finger, a user palm and a dielectric object as the object.

According to another aspect, the apparatus further includes a processing circuit that detects a movement gesture of the object while the object remains in proximity to the display and compares the movement gesture with a registered gesture, wherein the display controller restores the display to a steady state when the movement gesture matches the registered gesture.

According to another aspect, the registered gesture is one of a user registered gesture and an installed registered gesture.

According to another aspect, the display controller causes an indicator to be displayed on the display when the detector detects the object to be in proximity to the display.

According to an image display control method embodiment, the method includes:

changing with a display controller a display from a first display state to a second display state after an object is not detected as being proximate to the display for a predetermined time period;

detecting with a detector that the object is moved into proximity of the display; and restoring the display to the first display state when the detecting detects the object as being in proximity to the display.

According to another image display control method embodiment, the method includes:

detecting with a detector an object being in proximity of a display; and changing with a display controller the display to a first display state from a second display state when the object is detected as being in proximity to the display, the second display state being a lower power state than the first display state.

Accordingly, display may be restored by an easier operation for the user.

DETAILED DESCRIPTION OF EMBODIMENTS

Configuration Example of Image Pickup Apparatus

Figure 1:
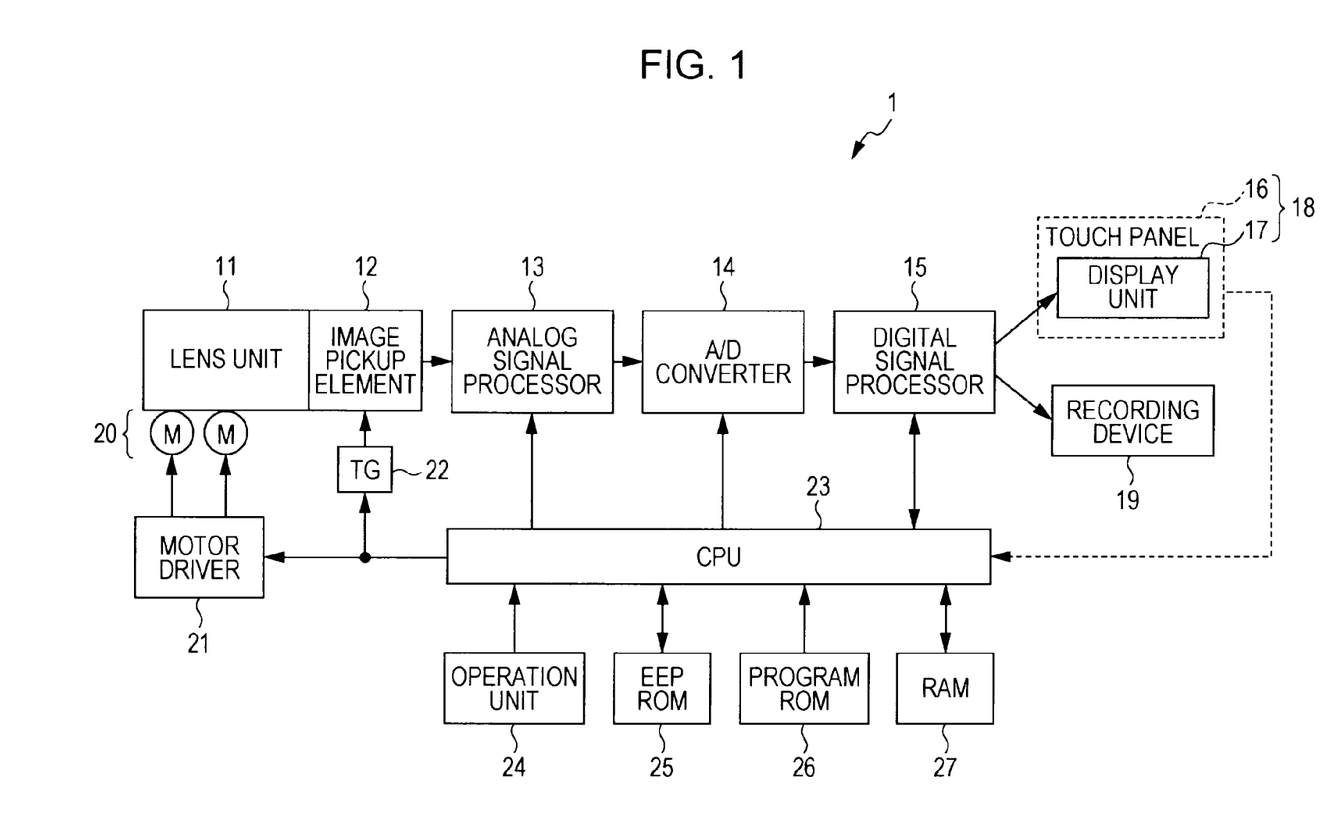
FIG. 1 is a block diagram illustrating a configuration of an image pickup apparatus of an image display control apparatus according to an embodiment of the present disclosure.

FIG. 1 is a block diagram illustrating a configuration of an image pickup apparatus serving as an image display control apparatus according to an embodiment of the present disclosure.

An image pickup apparatus 1 shown in FIG. 1 includes a lens unit 11 to a RAM 27.

The lens unit 11 includes a photographing lens, an aperture, a focus lens, and the like. On an optical path of object light which emitted through the lens unit 11, an image pickup element 12 such as a CCD (Change Coupled Device) sensor is disposed.

The image pickup element 12, an analog signal processor 13, an A/D (Analog/Digital) converter 14, and a digital signal processor 15 are connected in this order.

Furthermore, a display unit 17 and a recording device 19 are connected to the digital signal processor 15. A touch panel 16 is disposed on an image display screen of the display unit 17. The touch panel 16 and the display unit 17 constitute a touch screen 18. The display unit 17 includes a liquid crystal display (LCD) or the like.

To the lens unit 11, an actuator 20 used to control the aperture included in the lens unit 11 and move the focus lens included in the lens unit 11 is connected. To the actuator 20, a motor driver 21 is also connected. The motor driver 21 controls driving of the actuator 20.

A CPU (Central Processing Unit) 23 controls the entire image pickup apparatus 1. Therefore, the analog signal processor 13, the A/D converter 14, the digital signal processor 15, the motor driver 21, a TG (Timing Generator) 22, an operation unit 24, an EEPROM (Electrically Erasable Programmable ROM) 25, a program ROM (Read Only Memory) 26, the RAM (Random Access Memory) 27, and the touch panel 16 are connected to the CPU 23.

The touch panel 16 which is an electrostatic touch panel, for example, detects tapping (touch) performed on the touch panel 16 and outputs information on a tapped position on the touch panel 16 to the CPU 23. Furthermore, the touch panel 16 may detect the user's finger approaching the touch panel 16 within a predetermined distance (hereinafter referred to as "proximity", where appropriate) according to change (a level) of electrostatic capacitance even though the user's finger has not yet touched the touch panel 16. A distance within which the touch panel 16 may detect the proximity is a distance within approximately 20 mm from the screen. Within a distance of 10 mm, a position on the touch panel 16 to which the finger comes close may be recognized. Note that a target of detection of contact or proximity using the touch panel 16 is not limited to a user's finger, but similar dielectric object may be detected. Hereinafter, it is assumed that a user's finger is to be detected.

The recording device 19 is constituted by a removable recording medium including an optical disc such as a DVD (Digital Versatile Disc) and a semiconductor memory such as a memory card. The recording device 19 records a (signal of) image obtained through image capturing. The recording device 19 is detachable from a body of the image pickup apparatus 1.

The EEPROM 25 stores various set information. The EEPROM 25 further stores other information such as information to be held even when a power source is brought to an off state.

The program ROM 26 stores programs to be executed by the CPU 23 and data used to execute the programs.

The RAM 27 serving as a work area temporarily stores programs and data used when the CPU 23 executes various processes.

Hereinafter, entire operation of the image pickup apparatus 1 of the configuration in FIG. 1 will be briefly described.

The CPU 23 controls the various units included in the image pickup apparatus 1 by executing the programs recorded in the program ROM 26. Then, the CPU 23 executes predetermined processes including an image capturing process and a process of controlling display of an image in the display unit 17 in accordance with a signal supplied from the touch panel 16 or a signal supplied from the operation unit 24.

The operation unit 24 is operated by the user and supplies a signal corresponding to the operation to the CPU 23. The operation unit 24 includes a zoom lever (TELE/WIDE) 41 and a shutter button 42 which will be described hereinafter with reference to FIG. 2, for example.

When the actuator 20 is driven, the lens unit 11 is exposed from or accommodated in a case of the image pickup apparatus 1. Furthermore, when the actuator 20 is driven, the aperture included in the lens unit 11 is controlled and the focus lens included in the lens unit 11 is moved.

The TG 22 supplies a timing signal to the image pickup element 12 under control of the CPU 23. In accordance with the timing signal, an exposure time and the like in the image pickup element 12 are controlled.

The image pickup element 12 operates in response to the timing signal supplied from the TG 22 so as to receive object light incident through the lens unit 11 and perform photoelectric conversion. Then, the image pickup element 12 supplies an analog image signal corresponding to an amount of the received light to the analog signal processor 13. Here, the motor driver 21 drives the actuator 20 under control of the CPU 23.

The analog signal processor 13 performs an analog signal process such as amplification on the analog image signal supplied from the image pickup element 12 under control of the CPU 23. A resultant analog image signal is supplied from the analog signal processor 13 to the A/D converter 14.

The A/D converter 14 performs A/D conversion on the analog image signal supplied from the analog signal processor 13 under control of the CPU 23. A resultant digital image signal is supplied from the A/D converter 14 to the digital signal processor 15.

The digital signal processor 15 performs an digital signal process such as a noise removal process on the digital image signal supplied from the A/D converter 14 under control of the CPU 23. The digital signal processor 15 causes the display unit 17 to display an image corresponding to the digital image signal.

Furthermore, the digital signal processor 15 performs compression encoding on the digital image signal supplied from the A/D converter 14 in accordance with a predetermined compression encoding method such as JPEG (Joint Photographic Experts Group). The digital signal processor 15 causes the recording device 19 to record the digital image signal which has been subjected to the compression encoding.

The digital signal processor 15 also reads the digital image signal which has been subjected to the compression encoding from the recording device 19 and performs decompression decoding in accordance with a decompression decoding method corresponding to the predetermined compression encoding method. The digital signal processor 15 causes the display unit 17 to display an image corresponding to the digital image signal.

In addition, the digital signal processor 15 generates an image of an AF (auto focus) frame used to fulfill an AF function and an image of a menu button under control of the CPU 23 and causes the display unit 17 to display the images.

The image captured by the image pickup element 12 is displayed in the display unit 17. In this case, the AF frame is set on the image displayed in the display unit 17. In accordance with an image included in the AF frame, focus control is performed.

As described above, the image pickup apparatus 1 has the AF function. The image pickup apparatus 1 further has an AE (Automatic Exposure) function and an AWB (Auto White Balance) function. These functions are realized when the CPU 23 reads and executes programs stored in the program ROM 26. Furthermore, the AF function, the AE function, and the AWB function are merely examples of functions included in the image pickup apparatus 1. That is, the image pickup apparatus 1 has various functions relating to photographing.

Figure 2A:
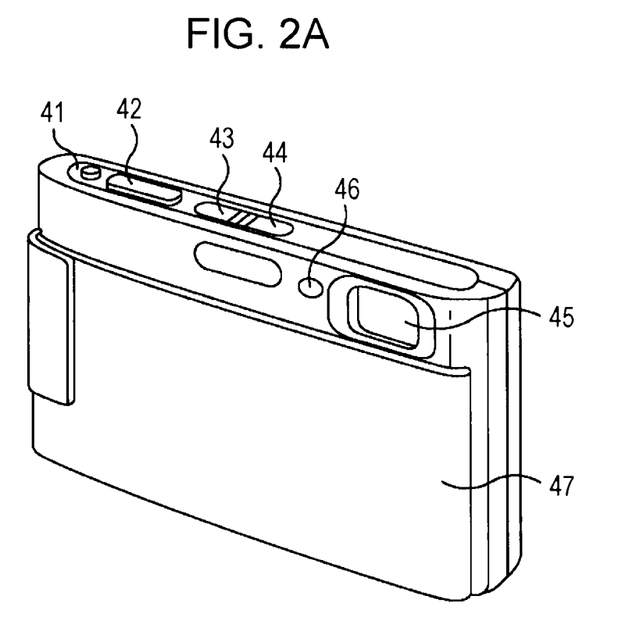
FIGS. 2A and 2B are perspective views illustrating configurations of appearances of the image pickup apparatus shown in FIG. 1.
Figure 2B:
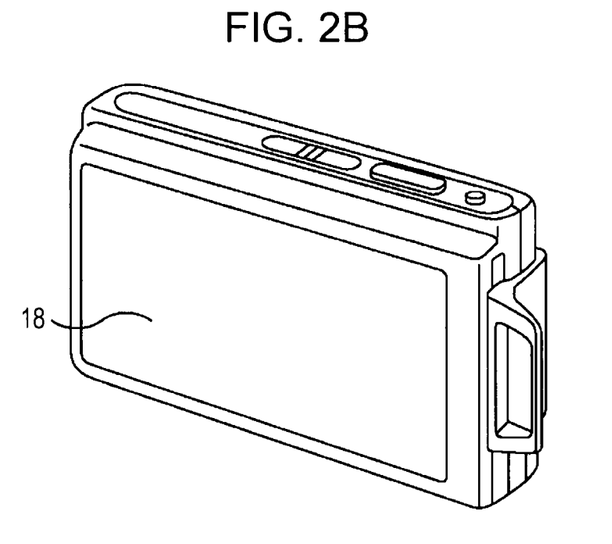

FIGS. 2A and 2B are perspective views illustrating configurations of appearances of the image pickup apparatus 1 shown in FIG. 1.

Note that, among planes of the image pickup apparatus 1, a plane which faces an object when the user captures the object, that is, a plane including the lens unit 11 disposed thereon is referred to as a "front face". On the other hand, among the planes of the image pickup apparatus 1, a plane which faces the user when the user captures the object, that is, a plane positioned opposite to the front face is referred to as a "rear face". Furthermore, among the planes of the image pickup apparatus 1, a plane located on an upper side and a plane disposed on a lower side when the user captures the object are referred to as an "upper face" and a "lower face", respectively.

FIG. 2A is a perspective view illustrating a configuration of an appearance of the front face of the image pickup apparatus 1 shown in FIG. 1. FIG. 2B is a perspective view illustrating a configuration of an appearance of the rear face of the image pickup apparatus 1.

The front face of the image pickup apparatus 1 may be covered by a lens cover 47. When the lens cover 47 is opened downward in the drawing, a state shown in FIG. 2A is obtained. As shown in FIG. 2A, an upper portion of the front face in which the lens cover 47 is removed includes a photographing lens 45 and an AF illuminator 46 included in the lens unit 11 in this order from the right side.

The AF illuminator 46 also serves as a self-timer lamp. The upper face of the image pickup apparatus 1 includes the zoom lever (TELE/WIDE) 41, the shutter button 42, a reproducing button 43, and a power button 44 arranged thereon in this order from the left side of FIG. 2A. The zoom lever 41, the shutter button 42, the reproducing button 43, and the power button 44 are included in the operation unit 24 shown in FIG. 1.

As shown in FIG. 2B, the touch screen 18 is disposed on the entire rear face of the image pickup apparatus 1.

In the touch screen 18, an image captured by the image pickup element 12 is displayed in a photographing mode for capturing an object whereas an image recorded in the recording device 19 is displayed in a reproducing mode for displaying an image which has been captured. In addition, in the touch screen 18, a menu button used to set (change) various setting items of the image pickup apparatus 1, a flash-mode selection button, a self-timer button, a reproduction/display button, and the like are displayed as GUIs (Graphical User Interfaces).

Image Display Control in First Embodiment

The image pickup apparatus 1 has a function of changing a display state of the touch screen 18 for power saving or the like when the user's operation has not bee performed for a predetermined period of time. Next, first display control performed by the image pickup apparatus 1 (CPU 23) which is image display control according to a first embodiment of the present disclosure will be described with reference to FIGS. 3 to 5.

Example of Screen in First Display Control

Figure 3:
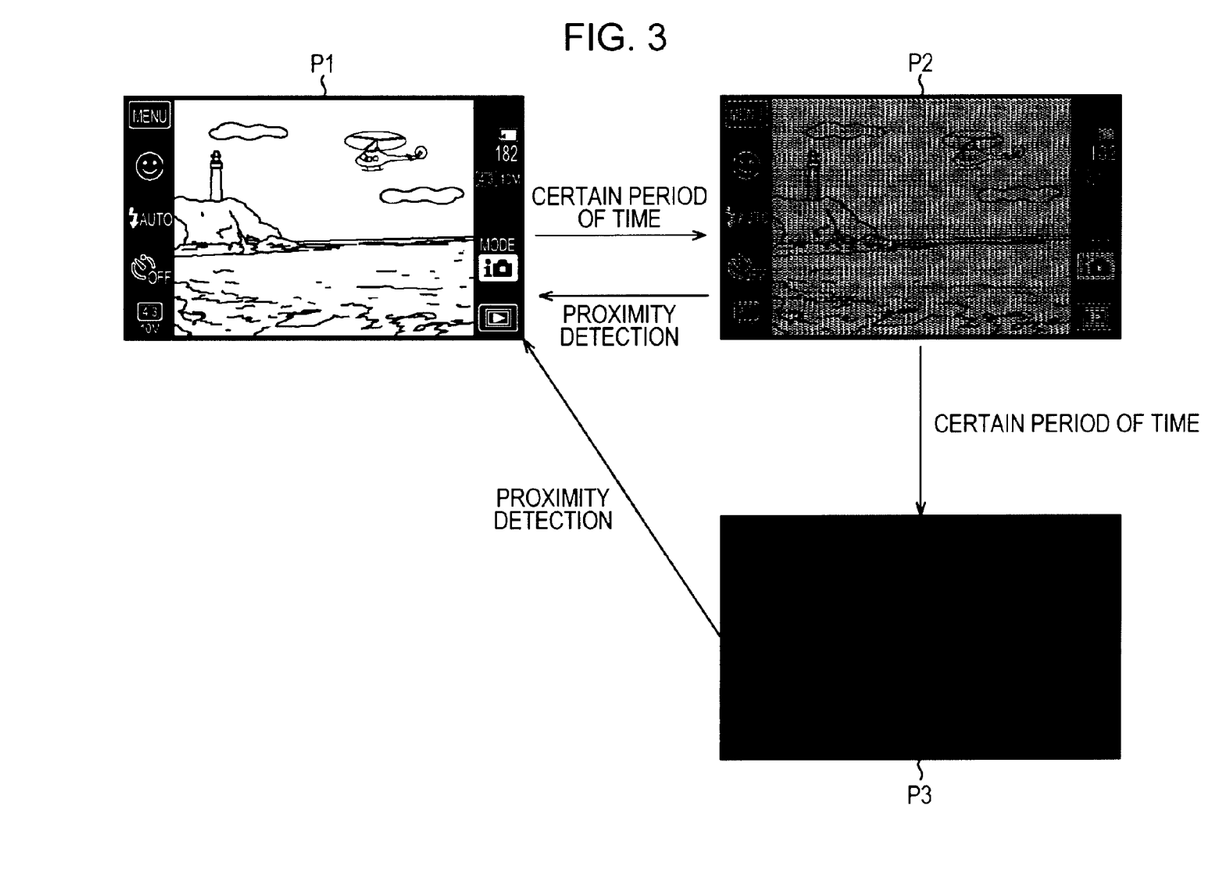
FIG. 3 is a diagram illustrating screens displayed by first display control of the image pickup apparatus shown in FIG. 1.

FIG. 3 shows examples of screens displayed in the touch screen 18 in accordance with the first display control performed by the image pickup apparatus 1.

When the user performs an operation relating to photographing on the image pickup apparatus 1 in the photographing mode, a photographing standby screen P1 shown in FIG. 3 is displayed in the touch screen 18 as a steady state in which processes corresponding to all user's operations are allowed to be performed. In the photographing standby screen P1, an image captured by the image pickup element 12 is displayed at the center of the screen. In a left end region and a right end region in the screen which are arranged so as to sandwich the image, (images of) a menu button, a flash-mode selection button, a self-timer button, a reproduction/display button, and the like are displayed. Hereinafter, the predetermined operation buttons displayed in the photographing standby screen P1 are collectively referred to as GUI operation buttons.

In the steady state in which the captured image P1 is displayed in the display unit 17, when the user's operation has not been performed for a predetermined period of time, the image pickup apparatus 1 changes the display state to a low-luminance state in which display luminance of the display unit 17 is reduced from that in the steady state. A low-luminance screen P2 shown in FIG. 3 is displayed in the display unit 17 at the time of the low-luminance state. The low-luminance screen P2 is the same as the photographing standby screen P1 except that a luminance level is changed.

In the low-luminance state in which the low-luminance screen P2 is displayed in the display unit 17, when the user's finger in the proximity state is detected, the image pickup apparatus 1 changes the display state of the display unit 17 to the steady state. That is, the image pickup apparatus 1 restores the display of the display unit 17 to the photographing standby screen P1.

However, in the low-luminance state, if the user's operation has not been performed further a predetermined period of time, the image pickup apparatus 1 changes the display state to a black-out state in which the display of the display unit 17 is turned off (blacked out). A display-off screen P3 shown in FIG. 3 is displayed in the display unit 17 at the time of the black-out state.

Then, in the black-out state, when the user's finger in the proximity state is detected, the image pickup apparatus 1 changes the display state of the display unit 17 to the steady state. That is, the image pickup apparatus 1 restores the display of the display unit 17 to the photographing standby screen P1.

Flowchart of First Display Control

Figure 4:
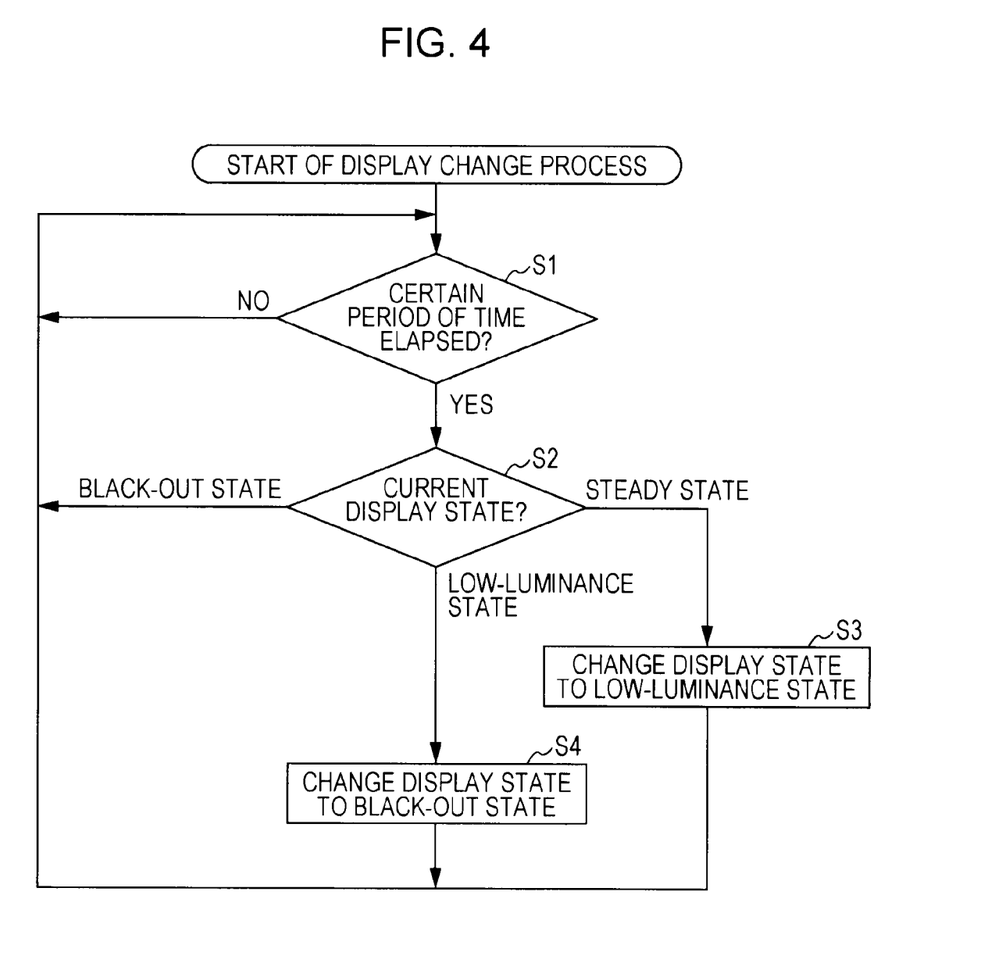
FIG. 4 is a flowchart illustrating a display change process of the first display control.

FIG. 4 is a flowchart illustrating a display change process in the first display control described with reference to FIG. 3. The display change process is performed when a user's operation is not performed.

First, in step S1, the image pickup apparatus 1 determines whether a predetermined period of time has been elapsed while a user's operation is not performed. Here, the user's operation includes an operation performed on the touch panel 16 and an operation performed on the operation unit 24 including the zoom lever 41 and the shutter button 42.

The process in step S1 is repeatedly performed until it is determined that the predetermined period of time has been elapsed. When it is determined that the predetermined period of time has been elapsed, the process proceeds to step S2.

In step S2, the image pickup apparatus 1 determines whether a current display state of the display unit 17 is the steady state, the low-luminance state, or the black-out state.

When it is determined that the current display state is the steady state in step S2, the process proceeds to step S3 where the image pickup apparatus 1 changes the display state of the display unit 17 to the low-luminance state.

On the other hand, when it is determined that the current display state is the low-luminance state in step S2, the process proceeds to step S4 where the image pickup apparatus 1 changes the display state of the display unit 17 to the black-out state.

Alternatively, when it is determined that the current display state is the black-out state in step S2, the process directly returns to step S1.

The display change process described above is executed until the power of the image pickup apparatus 1 is turned off.

Figure 5:
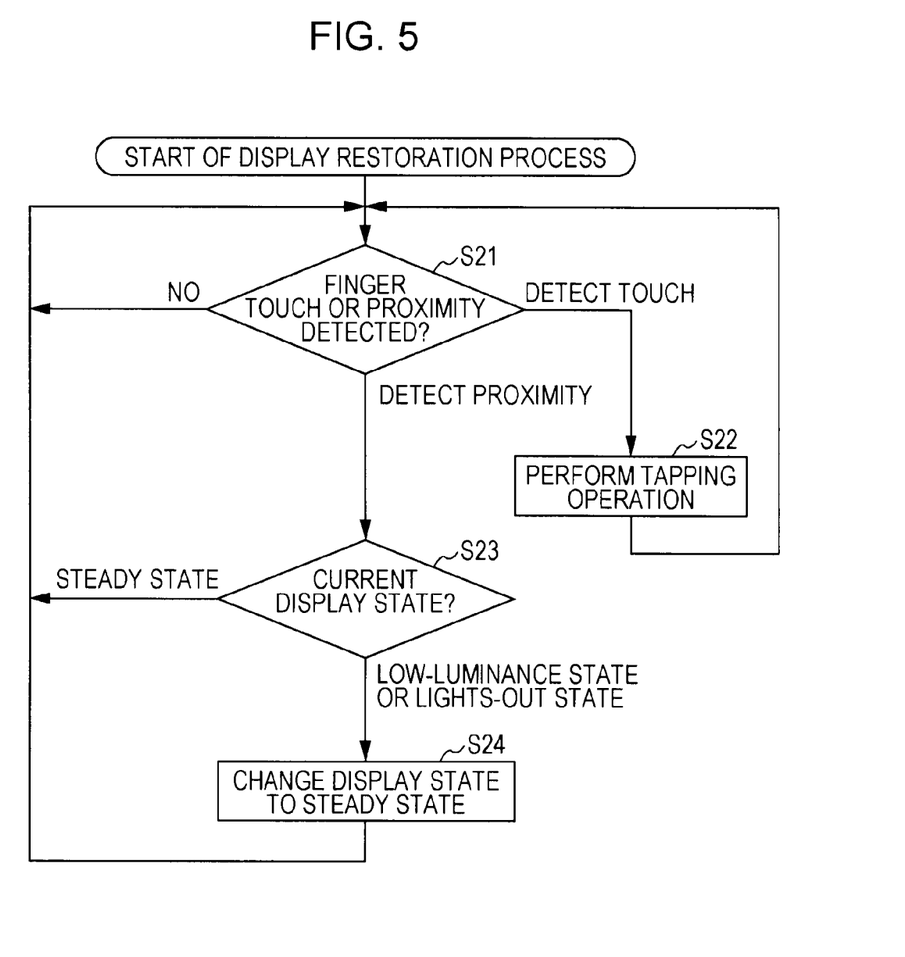
FIG. 5 is a flowchart illustrating a display restoration process of the first display control.

FIG. 5 is a flowchart illustrating a display restoration process in the first display control described with reference to FIG. 3. The display restoration process is performed to detect proximity relative to the touch panel 16 and restore the display state to the steady state.

In step S21, the image pickup apparatus 1 determines whether touch or proximity of the user's finger relative to the touch panel 16 is detected.

The process in step S21 is repeatedly performed until the touch or the proximity of the user's finger is detected. Then, when it is determined that the touch of the user's finger is detected in step S21, the process proceeds to step S22 where the image pickup apparatus 1 executes a predetermined process (tapping process) corresponding to the touch of the finger. Thereafter, the process returns to step S21.

On the other hand, when it is determined that the proximity of the user's finger is detected in step S21, the process proceeds to step S23 where the image pickup apparatus 1 determines whether the current display state of the display unit 17 is the steady state, the low-luminance state, or the black-out state.

When it is determined that the current display state is the steady state in step S23, the process returns to step S21.

On the other hand, when it is determined that the current display state is the low-luminance state or the black-out state in step S23, the process proceeds to step S24 where the image pickup apparatus 1 changes the display state of the display unit 17 to the steady state. After the process in step S24, the process returns to step S21 and the process of step S21 onward is executed again.

The display restoration process described above is executed until the power of the image pickup apparatus 1 is turned off.

Image Display Control in Second Embodiment

Next, a second display control performed by the image pickup apparatus 1 (CPU 23) which is image display control according to a second embodiment of the present disclosure will be described.

Example of Screen in Second Display Control

Figure 6:
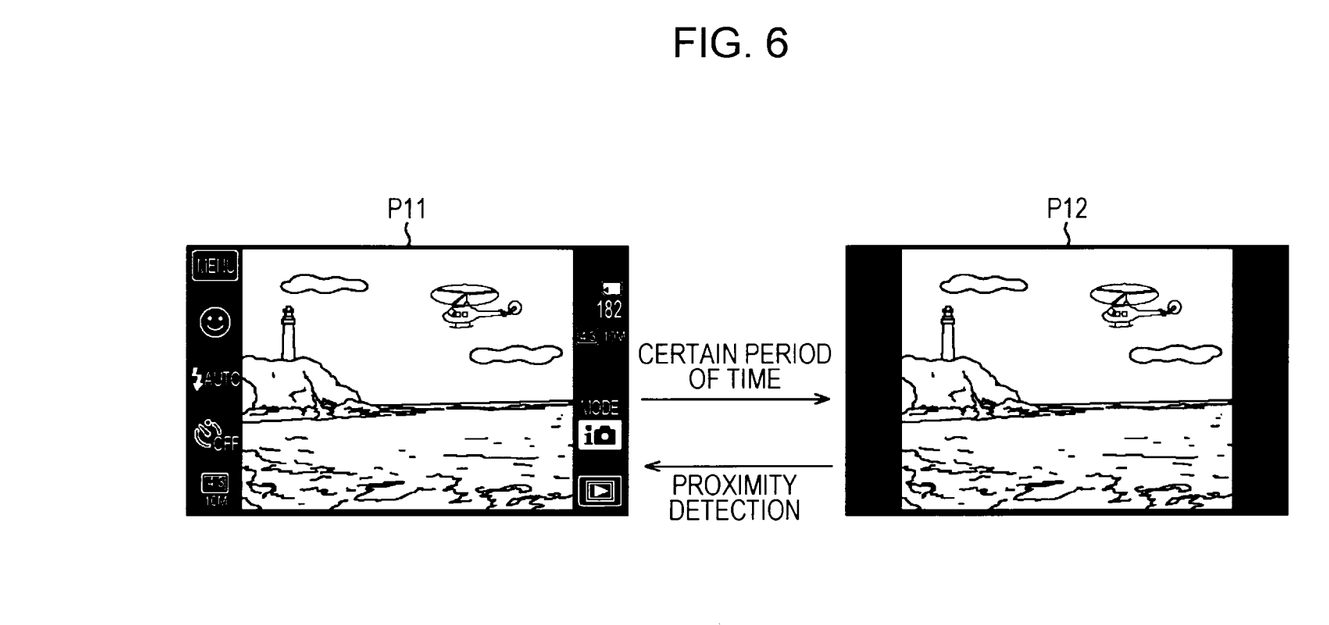
FIG. 6 is a diagram illustrating screens displayed by second display control of the image pickup apparatus shown in FIG. 1.

FIG. 6 shows examples of screens displayed in the touch screen 18 in accordance with the second display control performed by the image pickup apparatus 1.

In the steady state, the photographing standby screen P11 is displayed in the touch screen 18. The photographing standby screen P11 has the same screen configuration as the photographing standby screen P1 shown in FIG. 3.

In a case where the user's operation has not been performed for a predetermined period of time in the state in which the photographing standby screen P11 is displayed in the touch screen 18, the image pickup apparatus 1 changes the display state from the steady state to a button-off state. In the display unit 17 in the button-off state, a button-off screen P12 in which display of GUI operation buttons in the photographing standby screen P11 is removed is displayed.

Then, in the button-off state, when proximity of the user's finger relative to the touch panel 16 is detected, the image pickup apparatus 1 changes the display state of the display unit 17 to the steady state. That is, the image pickup apparatus 1 restores the display of the display unit 17 to the photographing standby screen P11.

Flowchart of Second Display Control

Figure 7:
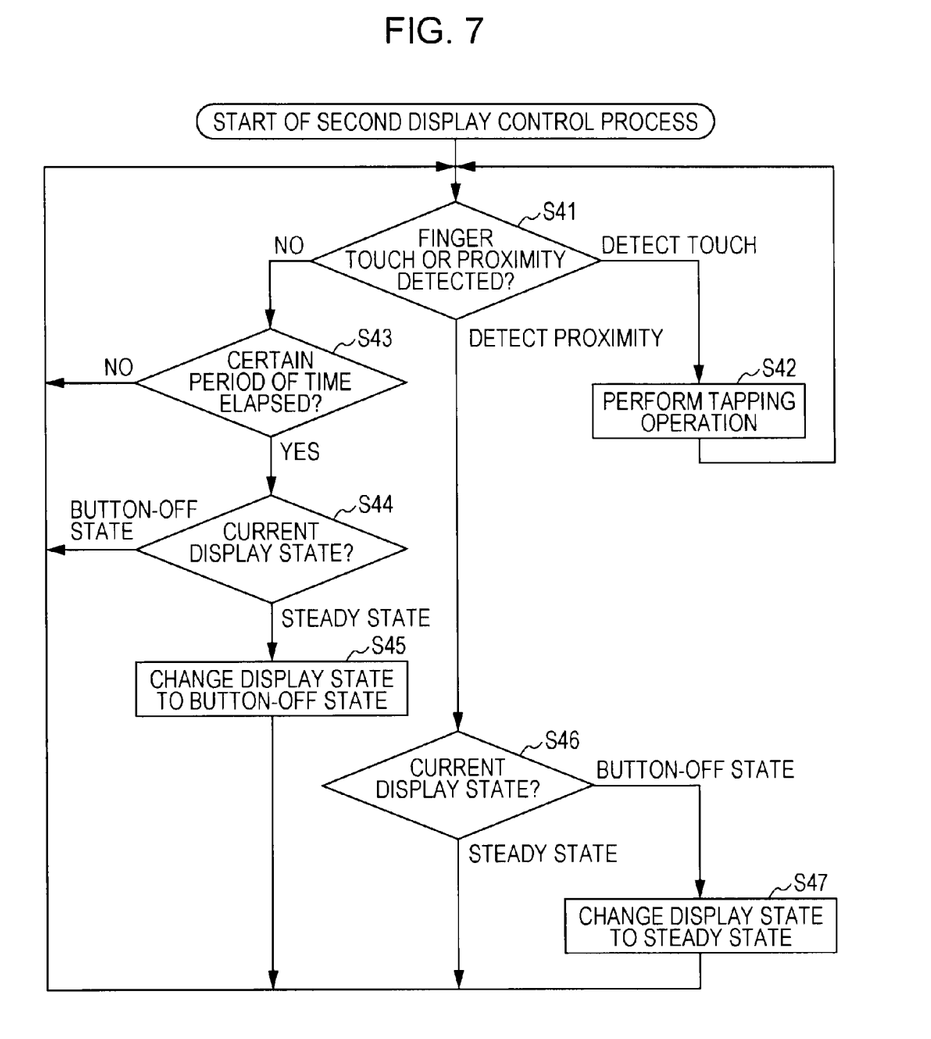
FIG. 7 is a flowchart illustrating a second display control process.

FIG. 7 is a flowchart illustrating the second display control process described with reference to FIG. 6.

First, in step S41, the image pickup apparatus 1 determines whether touch or proximity of the user's finger relative to the touch panel 16 is detected.

When it is determined that the touch of the user's finger is detected in step S41, the process proceeds to step S42 where the image pickup apparatus 1 executes a predetermined process (tapping process) corresponding to the touch of the finger. Then, the process returns to step S41.

On the other hand, when it is determined that the touch and the proximity of the user's finger are not detected in step S41, the process proceeds to step S43 where the image pickup apparatus 1 determines whether a predetermined period of time has been elapsed while a user's operation is not performed. Here, as with the first display control, the user's operation includes an operation of the operation unit 24.

When it is determined that the predetermined period of time has not been elapsed in step S43, the process returns to step S41 and the process in step S41 is executed again.

On the other hand, when it is determined that the predetermined period of time has been elapsed while a user's operation is not performed in step S43, the process proceeds to step S44 where the image pickup apparatus 1 determines whether the current display state of the display unit 17 is the steady state or the button-off state.

When it is determined that the current display state is the button-off state in step S44, the process returns to step S41.

On the other hand, when it is determined that the current display state is the steady state in step S44, the process proceeds to step S45 where the image pickup apparatus 1 changes the display state of the display unit 17 to the button-off state. That is, the image pickup apparatus 1 switches the photographing standby screen P11 to the button-off screen P12 in which the display of the GUI operation buttons is removed. After the process in step S45, the process returns to step S41 and the process of step S41 onward is executed again. The processes in step S41, step S43, and step S45 correspond to the display change process performed when a user's operation is not performed in the first display control process.

On the other hand, when it is determined that the proximity of the user's finger is detected in step S41 described above, the process proceeds to step S46 where the image pickup apparatus 1 determines whether the current display state of the display unit 17 is the steady state or the button-off state.

When it is determined that the current display state is the steady state in step S46, the process returns to step S41.

On the other hand, when it is determined that the current display state is the button-off state in step S46, the process proceeds to step S47 where the image pickup apparatus 1 changes the display state of the display unit 17 to the steady state. Specifically, the image pickup apparatus 1 changes the display from the button-off screen P12 in which the display of the GUI operation buttons is removed to the photographing standby screen P11. After the processes in step S47, the process returns to step S41 and the process of step S41 onward is executed again. The processes in step S41, step S46, and step S47 correspond to the display restoration process of detecting a proximity operation performed by the user and restoring the display state to the steady state.

The process described above is executed until the power of the image pickup apparatus 1 is turned off.

As described above, the CPU 23 of the image pickup apparatus 1 controls the display state of the touch panel 16 so that the first display state is changed to the second display state when a user's operation has not been performed for a predetermined period of time and the second display state is restored to the first display state when a user's proximity operation is detected.

In the first embodiment described above, the first display state corresponds to the steady state and the second display state corresponds to the low-luminance state or the black-out state. On the other hand, in the second embodiment, the first display state corresponds to the steady state and the second display state corresponds to the button-off state. Note that the user's finger is a representative example of a detection target in which proximity is detected, and a palm or other dielectric object may be employed.

By the image display control of the image pickup apparatus 1 described above, even when the user does not touch the touch screen 18, a proximity state enables restoration to the steady state. Accordingly, an easy method for restoration of display may be provided for a user who does not recognize an operation for restoration of the display.

Furthermore, while an operation of selecting one of the GUI operation buttons displayed in the display unit 17 is performed, a proximity state is entered before the touch screen 18 is touched. Therefore, according to the image display control of the image pickup apparatus 1, tapping for display restoration and tapping for selection of one of the GUI operation buttons which are generally performed by two operations may be performed by one operation, and therefore, operability is improved. Accordingly, display may be restored by an easier operation for the user.

Furthermore, since the restoration to the steady state may be performed without touching the touch screen 18, finger prints and dirt are prevented from being attached due to the touch operation.

Note that, although the description has been made taking the screen of the photographing mode as an example in the foregoing embodiments, the same display control process is executed also in the screen of the reproducing mode.

Modification

Embodiments of the present disclosure are not limited to the foregoing embodiments and various modifications may be made without departing from the scope of the present disclosure.

For example, depending on a proximity state (distance) in which the user's finger is brought close to the touch panel 16, not only a determination as to whether the user's finger is brought close to the touch panel 16 but also recognition of a position (coordinate) of the user's finger in the proximity state on the screen may be performed.

Therefore, the image pickup apparatus 1 (CPU 23) may detect a user's operation (gesture) of drawing a specific graphic by the finger in the proximity state and restore the display to the steady state when the detected gesture is the same as a gesture registered in advance. Registration of the gesture may be made by user registration of the gesture, or a previously registered (or pre-installed) gesture. This is effective when simple detection of proximity causes excessive detection. The detection of only a proximity state or the detection of a gesture in a proximity state as an operation of display restoration may be switched from one to another by a setting. Furthermore, a gesture serving as a target of detection may be registered in the image pickup apparatus 1 in advance or the user may register a desired gesture.

Note that, in a case where a gesture in a proximity state is detected as an operation of display restoration, when the display is not restored from the black-out state even if the user performs a gesture in a proximity state, the user may not recognize whether the black out occurred due to running out of battery or due to a wrong gesture. To address this problem, when the proximity of the user is detected, a predetermined GUI such as a cursor (display of a plus mark) or a character string "proximity detected" may be displayed. Accordingly, the user may easily recognize the reason that the display is not restored is not running out of battery but a wrong gesture.

Example of Configuration of Computer

The series of processes described above may be executed by hardware or software.

Figure 8:
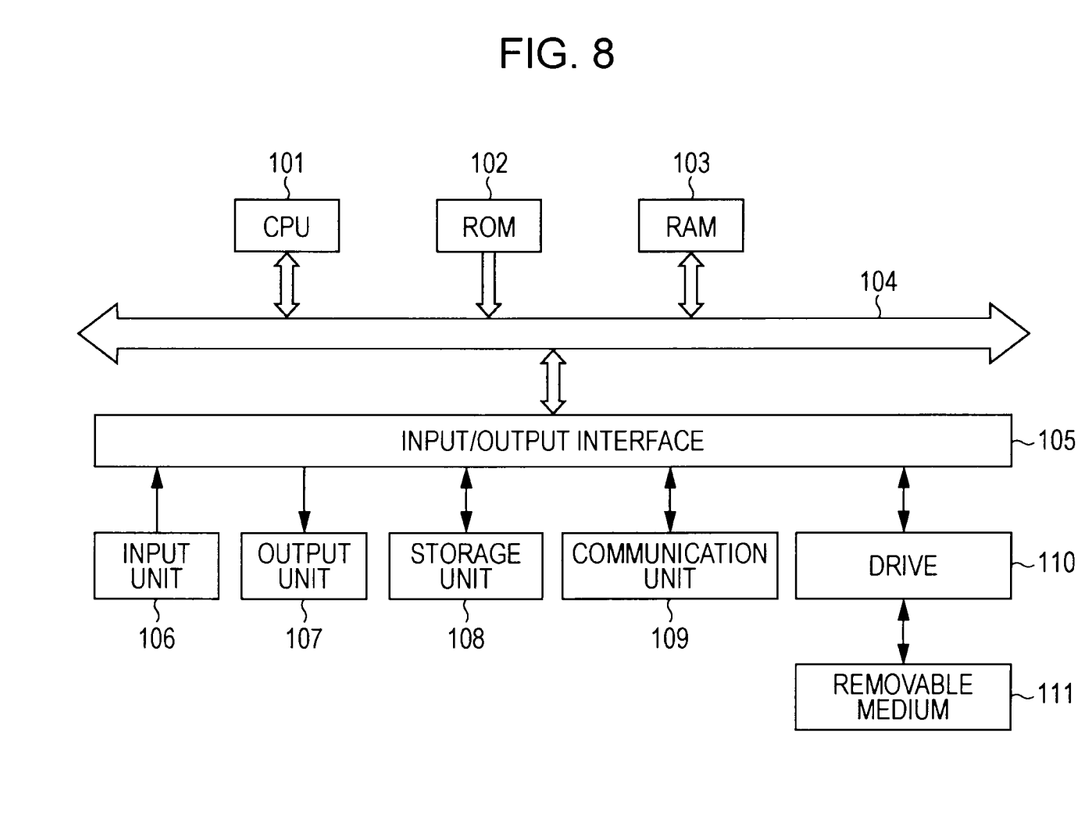
FIG. 8 is a block diagram illustrating a configuration of a computer according to another embodiment of the present disclosure.

In this case, it is apparent that the image pickup apparatus 1 shown in FIG. 1 may execute the series of processes, and in addition, a personal computer shown in FIG. 8 may execute the series of processes.

In FIG. 8, a CPU 101 executes various processes in accordance with programs stored in a ROM (Read Only Memory) 102 and programs loaded in a RAM (Random Access Memory) 103 from a storage unit 108. The RAM 103 further stores data used to execute the various processes by the CPU 101 where appropriate.

The CPU 101, the ROM 102, and the RAM 103 are connected to one another through a bus 104. Furthermore, an input/output interface 105 is also connected to the bus 104.

To the input/output interface 105, an input unit 106 including a keyboard and a mouse, an output unit 107 including a touch panel display and a speaker, the storage unit 108 including a hard disk, and a communication unit 109 including a modem and a terminal adapter are connected. The communication unit 109 controls communication with another apparatus (not shown) through a network such as the Internet.

To the input/output interface 105, a drive 110 is also connected where appropriate, and a removable medium 111 such as a magnetic disk, an optical disc, a magneto-optical disc, or a semiconductor memory is attached where appropriate. A computer program read from the removable medium 111 is installed in the storage unit 108 where appropriate.

When the series of processes is to be executed by software, programs included in the software is installed in a computer incorporated in dedicated hardware or a general personal computer capable of executing various functions by installing various programs, for example, by a network or a recording medium.

In this specification, a step of writing a program to be recorded in a recording medium apparently includes processes performed in a certain order in a time-series manner and also includes processes which are not executed in a time-series manner, that is, executed in parallel, or individually executed.

Hereinabove, the liquid crystal display is used as the display unit 17 in which display thereof is controlled by the image display control apparatus according to the present disclosure. However, the present disclosure is applicable to not only the liquid crystal display but also the following display apparatus. Specifically, the present disclosure is applicable to a display apparatus which receives an instruction for display in a unit of a frame, a field, or the like which constitutes a moving image (hereinafter, such a unit is referred to as a comma). In such a display apparatus, a plurality of pixels included in a comma include display elements and some of the display elements are held for a predetermined period of time. Note that, such a display element is referred to as a hold display element hereinafter, and such a display apparatus including a screen including such hold display elements is referred to as a hold display apparatus. Specifically, the liquid crystal display apparatus is merely an example of the hold display apparatus, and the present disclosure is applicable to all hold display apparatuses.

Furthermore, in addition to the hold display device, the present disclosure is applicable to a flat self-luminance display apparatus utilizing an organic EL (Electro Luminescent) device as a light-emitting device. Specifically, the present disclosure is applicable to all display apparatuses including display elements which display pixels constituting an image. Note that such a display apparatus is referred to as a pixel display apparatus. Here, in the pixel display apparatus, it is not necessarily the case that a single pixel corresponds to a single display element.

In other words, any display apparatus in which display thereof is controlled by an image display control apparatus according to the present disclosure may be employed as long as the display apparatus is capable of executing the series of processes described above.

Furthermore, in the foregoing embodiments, the case where the present disclosure is applied to the image pickup apparatus (such as a digital still camera) including the display apparatus (display unit) has been described. However, the image display control according to the present disclosure is applicable to other electronic apparatuses including display apparatuses such as a PDA (Personal Digital Assistants), a cellular phone, a portable game device, a portable reproducing apparatus, a television receiver, and the like.

The present disclosure contains subject matter related to that disclosed in Japanese Priority Patent Application JP 2010-284322 filed in the Japan Patent Office on Dec. 21, 2010, the entire contents of which are hereby incorporated by reference.

What is claimed is:

1. An image display control apparatus comprising:
   circuitry configured to
   measure a period of time in which an object is beyond a proximity of a touch display;
   change the touch display from a high-luminance state to a low-luminance state in response to the measured period of time being longer than a predetermined period of time and restart the measured period of time;
   change the touch display from the low-luminance state to a non-luminance state in response to the measured period of time being longer than a predetermined period of time;
   perform a first determination of whether a touch of a button displayed on the touch display or the object in proximity to the touch display is detected;
   perform a second determination of a current display state of the touch display in case it is determined in the first determination that the object in proximity to the touch display is detected;
   in case it is determined in the second determination that the current display state is the low-luminance state or the non-luminance state, change the touch display to the high-luminance state in response to a detection of the object in proximity to the touch display; and
   in case it is determined in the first determination that the touch of the button is detected, perform an operation associated with the button displayed on the touch display and change the touch display to the high-luminance state in response to a touch of the button on the touch display, wherein
   performance of the operation includes executing an image capturing process and executing a process of controlling display of an image on the touch display based on the touch of the button.

2. The apparatus of claim 1, wherein the high-luminance state is a steady state.

3. The apparatus of claim 1, wherein the non-luminance state is a black-out state.

4. The apparatus of claim 1, wherein the circuitry is further configured to display on the touch display a graphical user interface that includes a plurality of predetermined operational buttons in response to the touch display being in the high-luminance state, and display on the touch display the graphical user interface without the predetermined operational buttons in response to the touch display being in the low-luminance state.

5. The apparatus of claim 4, wherein the circuitry is further configured to change the touch display to the high-luminance state in response to the detection of the object being in proximity to the touch display.

6. The apparatus of claim 1, wherein the circuitry is further configured to detect one of a user finger, a user palm and a dielectric object as the object.

7. The apparatus of claim 1, further comprising:
processing circuitry configured to detect a movement gesture of the object while the object remains in proximity to the touch display, and compare the movement gesture with a registered gesture, wherein
the circuitry is further configured to restore the touch display to the high-luminance state in response to matching of the movement gesture with the registered gesture.

8. The apparatus of claim 7, wherein the registered gesture is one of a user registered gesture and a pre-installed gesture.

9. The apparatus of claim 1, wherein the circuitry is further configured to display an indicator on the touch display in response to the detection of the object to be in proximity to the touch display.

10. An image display control method, comprising:
measuring, by circuitry, a period of time in which an object is not in proximity of a touch display;
changing, by the circuitry, the touch display from a high-luminance state to a low-luminance state in response to the measured period of time being longer than a predetermined period of time and restarting the measured period of time;
changing, by the circuitry, the touch display from the low-luminance state to a non-luminance state in response to the measured period of time being longer than a predetermined period of time;
performing, by the circuitry, a first determination of whether a touch of a button displayed on the touch display or the object in proximity to the touch display is detected;
perform, by the circuitry, a second determination of a current display state of the touch display in case it is determined in the first determination that the object in proximity to the touch display is detected;
in case it is determined in the second determination that the current display state is the low-luminance state or the non-luminance state, changing, by the circuitry, the touch display to the high-luminance state in response to a detection of the object in proximity to the touch display; and
in case it is determined in the first determination that the touch of the button is detected, performing, by the circuitry, an operation associated with the button displayed on the touch display and changing, by the circuitry; the touch display to the high-luminance state in response to a touch of the button on the touch display, wherein
performance of the operation includes executing an image capturing process and executing a process of controlling display of an image on the touch display based on the touch of the button.

11. The image display control method of claim 10, wherein the high-luminance state is a steady state.

12. The image display control method of claim 10, wherein the non-luminance state is a black-out state.

13. The image display control method of claim 10, further comprising:
displaying, by the circuitry, on the touchscreen display a graphical user interface that includes a plurality of predetermined operational buttons in response to the touch display being in the high-luminance state; and
displaying; by the circuitry, on the touchscreen display the graphical user interface without the predetermined operational buttons in response to the touch display being in the low-luminance state.

14. The image display control method of claim 13, further comprising:
changing the touch display to the high-luminance state in response to the detection of the object being in proximity to the touch display.

15. The image display control method of claim 10, further comprising:
detecting, by the circuitry, one of a user finger, a user palm and a dielectric object as the object.

16. The image display control method of claim 10, further comprising:
detecting, by the circuitry, a movement gesture of the object while the object remains in proximity to the touch display;
comparing, by the circuitry, the movement gesture with a registered gesture; and
restoring, by the circuitry, the touch display to the high-luminance state in response to matching of the movement gesture with the registered gesture.

17. The image display control method of claim 16, wherein the registered gesture is one of a user registered gesture and a pre-installed gesture.

18. The image display control method of claim 10, further comprising:
displaying, by the circuitry, an indicator on the touch display in response to the detection of the object to be in proximity to the touch display.

19. A non-transitory computer-readable medium storing computer readable instructions that, when executed by a computer, cause the computer to execute a process, the process comprising:
measuring a period of time in which an object is not in proximity of a touch display;
changing the touch display from a high-luminance state to a low-luminance state in response to the measured period of time being longer than a predetermined period of time and restarting the measured period of time;
changing the touch display from the low-luminance state to a non-luminance state in response to the measured period of time being longer than a predetermined period of time;
performing a first determination of whether a touch of a button displayed on the touch display or the object in proximity to the touch display is detected;
performing a second determination of a current display state of the touch display in case it is determined in the first determination that the object in proximity to the touch display is detected;
in case it is determined in the second determination that the current display state is the low-luminance state or the non-luminance state, changing the touch display to the high-luminance state in response to detection of the object in proximity to the touch display; and in case it is determined in the first determination that the touch of the button is detected, performing an operation associated with the button displayed on the touch display and changing the touch display to the high-luminance state in response to a touch of the button on the touch display, wherein performance of the operation includes executing an image capturing process and executing a process of controlling display of an image on the touch display based on the touch of the button.

20. The apparatus of claim 1, wherein the circuitry is further configured to display, on the touch display, a graphical user interface that includes a plurality of predetermined operational buttons in response to the touch display being in one of the high-luminance state and the low-luminance state.

21. The apparatus of claim 20, wherein the button is one of the predetermined operational buttons included in the graphical user interface.

22. The image display control method of claim 10, further comprising displaying, on the touch display, a graphical user interface that includes a plurality of predetermined operational buttons in response to the touch display being in one of the high-luminance state and the low-luminance state.

23. The image display control method of claim 22, wherein the button is one of the predetermined operational buttons included in the graphical user interface.

* * * * *